(12) United States Patent
Inada et al.

(10) Patent No.: US 10,106,863 B2
(45) Date of Patent: Oct. 23, 2018

(54) METHOD FOR OPERATION OF BLAST FURNACE

(71) Applicants: NIPPON STEEL & SUMITOMO METAL CORPORATION, Tokyo (JP); JFE STEEL CORPORATION, Tokyo (JP); KOBE STEEL, LTD., Kobe-shi, Hyogo (JP); NISSHIN STEEL CO., LTD., Tokyo (JP); NIPPON STEEL & SUMIKIN ENGINEERING CO., LTD., Tokyo (JP)

(72) Inventors: Takanobu Inada, Tokyo (JP); Hiroshi Sakai, Tokyo (JP); Yutaka Ujisawa, Tokyo (JP)

(73) Assignees: NIPPON STEEL & SUMITOMO METAL CORPORATION, Tokyo (JP); JFE STEEL CORPORATION, Tokyo (JP); KOBE STEEL, LTD., Kobe-shi (JP); NISSHIN STEEL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 36 days.

(21) Appl. No.: 15/110,073

(22) PCT Filed: Jan. 6, 2015

(86) PCT No.: PCT/JP2015/050185
§ 371 (c)(1),
(2) Date: Jul. 6, 2016

(87) PCT Pub. No.: WO2015/105107
PCT Pub. Date: Jul. 16, 2015

(65) Prior Publication Data
US 2016/0326604 A1 Nov. 10, 2016

(30) Foreign Application Priority Data

Jan. 7, 2014 (JP) .................................. 2014-000901

(51) Int. Cl.
*C21B 5/06* (2006.01)
*C21B 7/16* (2006.01)
(Continued)

(52) U.S. Cl.
CPC .............. *C21B 5/003* (2013.01); *C21B 5/001* (2013.01); *C21B 5/06* (2013.01); *C21B 7/002* (2013.01);
(Continued)

(58) Field of Classification Search
CPC ................................ C21B 5/001; C21B 5/002
See application file for complete search history.

(56) References Cited

U.S. PATENT DOCUMENTS 2,790,711 A * 4/1957 Sellers et al. ............ C21B 5/001
266/156
4,707,183 A * 11/1987 Michard ................. C21B 5/002
266/82

FOREIGN PATENT DOCUMENTS

CN     101818218 A     9/2010
CN     103339266 A     10/2013
(Continued)

OTHER PUBLICATIONS

International Search Report for PCT/JP2015/050185 dated Feb. 10, 2015.
(Continued)

*Primary Examiner* — Scott R Kastler
(74) *Attorney, Agent, or Firm* — Birch, Stewart, Kolasch & Birch, LLP

(57) ABSTRACT

A method for operation of a blast furnace able to greatly reduce the $CO_2$ emission and enabling stable production of
(Continued)

pig iron over a long period of time in a commercial blast furnace, that is, a method for operation of a blast furnace in which iron ore and coke are charged from a furnace top and is blown in pulverized coal from a usual tuyere, comprising blowing in a gas containing at least one of hydrogen and hydrocarbon from the usual tuyere together with the pulverized coal and blowing a gas comprised of a top gas of the blast furnace from which carbon dioxide and steam is removed from a shaft tuyere into the blast furnace.

14 Claims, 9 Drawing Sheets

(51) Int. Cl.
    *C21B 5/00*     (2006.01)
    *F27B 1/10*     (2006.01)
    *C21B 7/00*     (2006.01)

(52) U.S. Cl.
    CPC .................. *C21B 7/16* (2013.01); *F27B 1/10* (2013.01); *C21B 2100/02* (2013.01); *C21B 2100/04* (2013.01); *C21B 2100/282* (2017.05); *Y02P 10/122* (2015.11); *Y02P 10/143* (2015.11); *Y02P 10/283* (2015.11)

(56) References Cited

FOREIGN PATENT DOCUMENTS

| | | |
|---|---|---|
| DE | 2037541 A1 | 2/1972 |
| EP | 2 543 743 A1 | 1/2013 |
| EP | 2653563 A1 | 10/2013 |
| JP | 52-32323 B2 | 8/1977 |
| JP | 63-57704 A | 3/1988 |
| JP | 5-179323 A | 7/1993 |
| JP | 5-86444 B2 | 12/1993 |
| JP | 2009-221547 A | 10/2009 |
| JP | 2010-275582 A | 12/2010 |
| JP | 2011-225969 A | 11/2011 |
| JP | 2013-147692 A | 8/2013 |
| RU | 2277127 C1 | 5/2006 |

OTHER PUBLICATIONS

Written Opinion of the International Searching Authority for PCT/JP2015/050185 (PCT/ISA/237) dated Feb. 10, 2015.

Mikael et al., "Final Evaluation of the Ulcos TGR-BF Pilot Tests Performed at the LKAB Experimental Blast Furnace," 6th International Congress on the Science and Technology of Ironmaking—ICSTI, ISSN 2176-3135, Oct. 14, 2012, pp. 960-970.

Birat et al., "ULCOS: the European Steel Industry's effort to find breakthrough technologies to cut its $CO_2$ emissions significantly," Carbon Dioxide Reduction Metallurgy, TMS (The Minerals, Metals & Materials Society), Mar. 9, 2008, pp. 59-69.

\* cited by examiner (A)

(B)

(C)

US 10,106,863 B2

METHOD FOR OPERATION OF BLAST FURNACE

TECHNICAL FIELD

The present invention relates to a method for operation of a blast furnace. In particular, it relates to a method for operation of a blast furnace relating to (1) blowing a gas with a high hydrogen content from a usual tuyere, (2) blowing a top gas from the usual tuyere or a tuyere provided at a middle stage of the furnace, and (3) blowing a gas with a high hydrogen content and a top gas from the usual tuyere during which making an oxygen enrichment of the blown gas 10% to 40%.

BACKGROUND ART

Production of hot metal in a blast furnace requires a carbonaceous material such as coke, but reduction of the amount of consumption of the carbonaceous material per ton of hot metal (below, called the "reducing agent rate") is a major objective for reducing manufacturing costs and has been pursued in the past.

For example, PLT 1 has the objective of reducing costs by increasing as much as possible the amount of consumption of small coal which was unable to be used in conventional blast furnace operations. PLT 1 discloses a method for operation of a blast furnace comprising blowing gas with an oxygen concentration of 40% or more from a tuyere at ordinary temperature, and the method comprises blowing the part of the pulverized coal containing +2 mm coarse grain coal in 5 to 30% and having a maximum grain size of 5 mm in the pulverized coal from the tuyere or near the tuyere into the furnace. Further, PLT 2 adjusts the ratio of the top gas blown from the blast furnace shaft tuyere and the top gas blown from the bottom tuyere to thereby match the amount of heat demand to the amount of heat supply of the blast furnace in the optimal state and enables remarkable improvement of the coke consumption and the charging efficiency over the known values. Further, PLT 3 discloses a method for operation of a blast furnace blowing fuel gas together with pulverized coal from a tuyere of the blast furnace to thereby secure the combustibility of the pulverized coal and improve the productivity and reduce the fuel cost (synonymous with reducing agent rate). Further, PLT 4 has the objective of stable, high productivity blast furnace operation and discloses a method for operation of a blast furnace blowing a gas with an oxygen concentration of 30% to less than 100% from the tuyere and blowing preheated gas from a shaft part at a middle stage of the blast furnace so thereby enable use of a large amount of pulverized coal.

Various technical innovations such as those explained above have enabled a remarkable improvement in the operating efficiency and led to the consumption of carbonaceous materials per ton of hot metal of a level below 500 kg.

In addition to such reduction of the reducing agent rate in blast furnace operation and other improvements of the manufacturing cost, in recent years, reduction of emissions of carbon dioxide ($CO_2$), one of the hothouse gases mainly causing global warming, has become widely sought. The steel industry, one of the main industries related to $CO_2$ emissions, has to respond to such social demands. Further reduction at blast furnace operations, which use large amounts of carbonaceous materials for iron and steel manufacture, is becoming urgent. The Japanese steel industry has established voluntary action targets to tackle reduction of $CO_2$ emissions, but is being pressed to develop new technologies with eye to the future.

However, none of PLTs 1 to 4 has reduction of $CO_2$ emissions as their main objectives. They do not sufficiently function to fundamentally cut the amount of generation of $CO_2$. In this way, so long as based on existing operating methods, even if viewed in terms of heat efficiency, the situation now is that no further room can be found for major reduction in the carbon consumption.

In view of such a situation, work on developing technology aiming at a major reduction in the carbon consumption in a blast furnace operations has been proceeding in Europe. That is, in the so-called "ULCOS" project, a blast furnace process based on an oxygen blast furnace combining $CO_2$ separation and recovery techniques, separating $CO_2$ from the top gas, reheating it, and re-blowing it into the furnace from a tuyere newly provided at the side wall of the furnace body at the middle stage of the blast furnace or from the usual tuyere is being developed (NPLT 1).

FIG. 1 shows the flow of the above ULCOS blast furnace process. It is a process flow considered to be the highest for the effect of reduction of the carbon consumption of a blast furnace. The most different features from ordinary blast furnace operation are (1) the point of not using hot air for blast from the usual tuyere but blowing oxygen and pulverized coal at room temperature, (2) blowing top gas into the blast furnace after separating $CO_2$ from all of the top gas to create "closed gas recycling", and (3) heating recycled gas of the top gas to a high temperature at a time when blowing it from the usual tuyere. Further, in the flow of the blast furnace process of FIG. 1, the indirect reduction degree of ore is a high 89.7%. A 28% reduction ratio of carbon is achieved for the 289 kg/tHM of the amount of carbon (C) charged per ton of hot metal (1 tHM) at the time of normal operation. Further, the $CO_2$ is separated from the top gas by the vacuum pressure swing adsorption method. The "vol" in FIG. 1 shows the amount of gas in the standard state.

These features pose serious risks when applied to commercial blast furnaces. That is, the above (1) requires that a large amount of pulverized coal is injected in so as to maintain the temperature of the combustion zone in front of the tuyere at a suitable value. According to a report of the ULCOS project, the pulverized coal rate (consumption of pulverized coal per ton of hot metal) has reached 300 kg/tHM and, as a result, the coke rate has fallen to 200 kg/tHM to less. With the current level of art of blast furnace operations which are only demonstrated at a generally 270 kg/tHM or more coke rate, it is not possible to easily create a stable operating state. In addition, since the oxygen is blown at room temperature, no sensible heat is input by the blown gas. Therefore, even if trouble occurs in operation causing the furnace to cool, the inside of the furnace cannot be quickly heated and it is difficult to restore operation. Further, the "closed gas recycling" operation of (2) has the risk of trace elements contained in the gas phase (for example, sulfur content etc.) being recycled and concentrating in the blast furnace process. There is a question as to whether stable operation can be maintained over a long period of time.

In this way, the blast furnace process aimed at by the ULCOS project would be hard to apply to a commercial blast furnace wherein hot metal production is required to be continued stably over a long period of time even if realization were possible on a short time test operation basis.

On the other hand, there is the method for cutting the carbon consumption by assigning hydrogen the reducing capacity that is one of the roles of carbon in blast furnace operation. That is, this is an operation blowing natural gas or coke oven gas (below, called "COG") or other reducing gas containing hydrogen into the blast furnace. There are a large number of inventions relating to such an operation method, but in particular the method for modifying the mixed gas of $CO_2$ and CO separated from the top gas to methane ($CH_4$) and again blowing the modified gas to the blast furnace for the purpose of reducing $CO_2$ emissions of blast furnaces has been disclosed (PLT 5).

This method separates and recovers $CO_2$ (and/or CO) from the top gas, adds $H_2$ to this to convert it to $CH_4$, then again blows this into the blast furnace, but there are issues such as the new need for a $CH_4$ conversion apparatus and the fact that if just blowing in $CH_4$, carbon consumption of the blast furnace cannot be sufficiently reduced. It cannot be said that the social demand for reduction of $CO_2$ emissions explained at the start can be sufficiently met.

CITATION LIST

Patent Literature

PLT 1. Japanese Patent Publication No. H05-86444B2
PLT 2. Japanese Patent Publication No. S52-32323B2
PLT 3. Japanese Patent Publication No. H05-179323A
PLT 4. Japanese Patent Publication No. S63-57704A
PLT 5. Japanese Patent Publication No. 2011-225969A Nonpatent Literature NPLT 1. "Final Evaluation of the Ulcos TGR-BF Pilot Tests Performed at the LKAB Experimental Blast", Pettrsson Mikael, Silkstrom Peter, Eklund Nicklas, *Proceedings of 6th ICSTI* (2012), p. 960

SUMMARY OF INVENTION

Technical Problem

Greatly reducing the carbon consumption of a blast furnace in the range of the existing operating technology is important. Further, provision of a method for operation of a blast furnace which can be quickly restarted even if trouble occurs causing the furnace to cool down and which enables stable production of hot metal without the risk of trace elements being recycled and condensed in the blast furnace process has become a goal. An object of the present invention is to provide a method for operation of a blast furnace able to greatly reduce $CO_2$ emissions and enabling production of hot metal stably over a long period in a commercial blast furnace.

Solution to Problem

The inventors etc. discovered that by blowing $CH_4$-containing gas with a high hydrogen content from a usual tuyere, blowing a top gas from which oxide components and $H_2O$ have been removed from a tuyere provided at a middle stage of the furnace (below, referred to as a "shaft tuyere"), and blowing $CH_4$-containing gas with a high hydrogen content and top gas from which oxide components and $H_2O$ have been removed from the usual tuyere with making an oxygen enrichment of the blast from the usual tuyere 10% to 40%, it is possible to greatly reduce $CO_2$ emissions and operate the blast furnace stably over a long time. Further, the "usual tuyere" is the tuyere provided at the lower stage of the furnace at the side below the shaft tuyere to blow pulverized coal or other auxiliary fuel together with hot air into the blast furnace.

The present invention was made based on this finding so as to solve the above problem and has as its gist the following:

(1) A method for operation of a blast furnace in which iron ore and coke are charged from a furnace top and pulverized coal is injected from a usual tuyere, comprising
blowing in a blast containing at least one of hydrogen and hydrocarbon from the usual tuyere together with the pulverized coal and
blowing a gas comprised of a top gas of the blast furnace from which carbon dioxide and steam are removed from a shaft tuyere into the blast furnace.

(2) The method for operation of a blast furnace according to (1) further comprising blowing blast comprised of top gas of the blast furnace from which carbon dioxide and steam are removed from the usual tuyere into the blast furnace.

(3) The method for operation of a blast furnace according to (1) or (2) wherein the blast from the usual tuyere is enriched with oxygen by an oxygen enrichment of not less than 10% and not more than a Y % shown in the following formula:

$$Y = 0.079 \times CH_4 + 32$$

(where, $CH_4$ indicates a vol % of methane in the gas blown into from the usual tuyere)

(4) The method for operation of a blast furnace according to any one of (1) to (3) wherein a blowing rate of the gas containing at least one of hydrogen and hydrocarbon is 30 $Nm^3$/tHM or more.

(5) The method for operation of a blast furnace according to any one of (1) to (4) wherein the top gas blown into from the shaft tuyere is blown in from the shaft tuyere and a blowing rate of 400 $Nm^3$/tHM or less at a temperature of 600° C. to 1000° C.

(6) The method for operation of a blast furnace according to any one of (1) to (5) wherein the blowing rate of top gas blown into from the shaft tuyere is 100 $Nm^3$/tHM or more.

(7) The method for operation of a blast furnace according to any one of (1) to (6) wherein the gas containing at least one of hydrogen and hydrocarbon blown in from the usual tuyere contains methane.

(8) The method for operation of a blast furnace according to (7) wherein the gas containing methane includes at least one of coke oven gas and natural gas.

Advantageous Effects of Invention

A method for operating a blast furnace to greatly reduce $CO_2$ emissions and to produce hot metal stably over a long period in a commercial blast furnace is provided.

BRIEF DESCRIPTION OF DRAWINGS

FIG. 7A shows the relationship between the oxygen enrichment and carbon consumption (kg/tHM). FIG. 7B shows the relationship between the oxygen enrichment and coke rate (kg/tHM) and the relationship between the oxygen enrichment (%) and blowing rate of recycled gas from a usual tuyere (Nm³/tHM). FIG. 7C shows the relationship between the oxygen enrichment and the recycled gas ratio of top gas (%)

FIG. 8A shows the relationship between the oxygen enrichment and carbon consumption (kg/tHM). FIG. 8B shows the relationship between the oxygen enrichment and coke rate (kg/tHM) and the relationship between the oxygen enrichment (%) and blowing rate of recycled gas from a usual tuyere (Nm³/tHM). FIG. 8C shows the relationship between the oxygen enrichment and the recycled gas ratio of top gas (%).

DETAILED DESCRIPTION OF THE INVENTION

Figure 1:
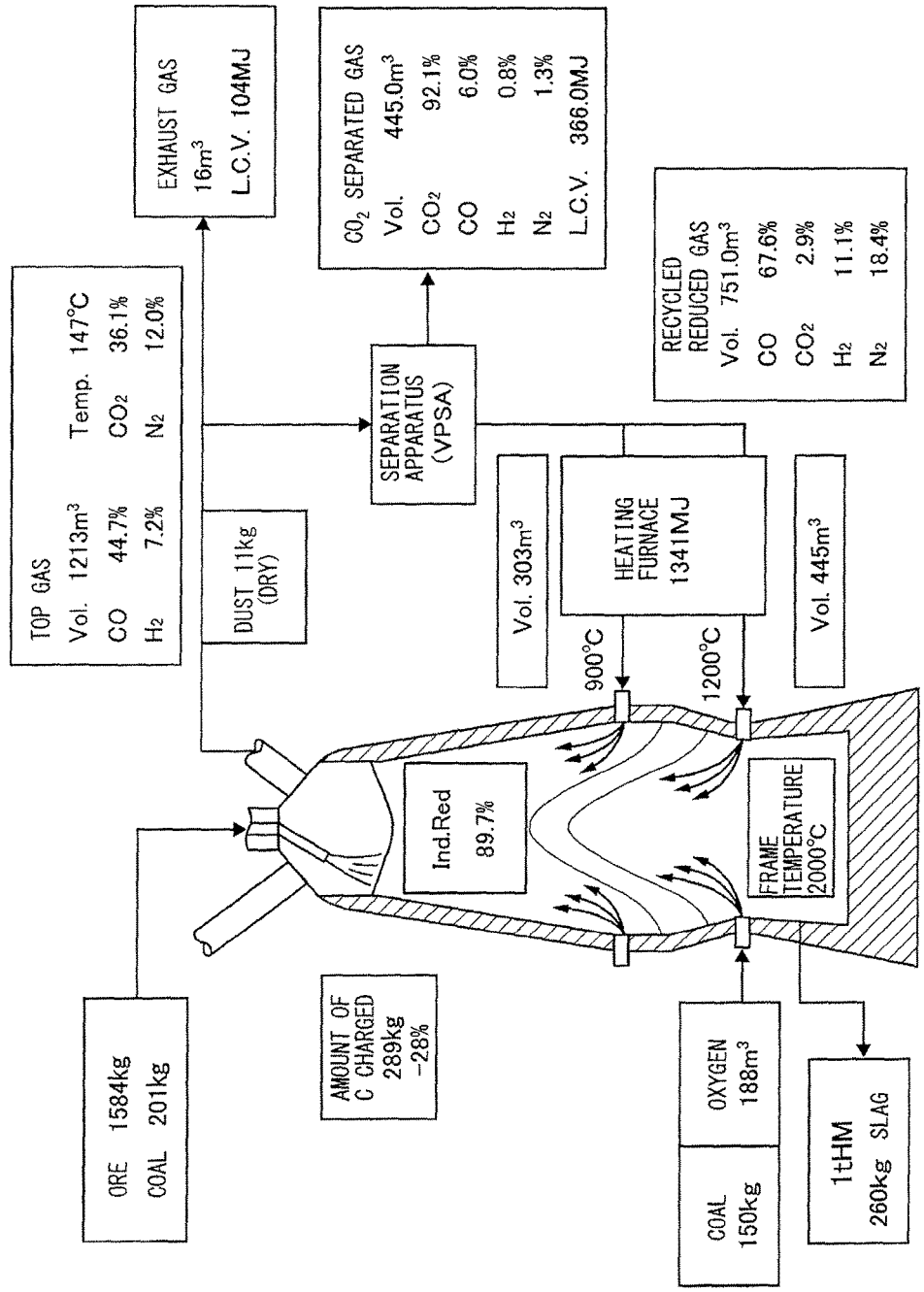
FIG. 1 is a view showing a flow of a ULCOS blast furnace process.

In order to reduce $CO_2$ emissions in the process of production of hot metal, it is necessary to reduce the carbon charge required for production of hot metal in a blast furnace. As explained above, the main role of carbon in a blast furnace is the supply of the heat for reducing and melting the iron ore (below, "iron ore" used as a general term for sintered ore, pellets obtained by agglomerating iron ore, or other iron source materials). In the present invention, the carbon consumption is reduced by replacing the carbon reducing agent with hydrogen for part of the reduction.

However, in blast furnace operation which reduces and melts iron ore at a high temperature field in the furnace which is autonomously formed by only charging raw materials from the top and a blast operation from a usual tuyere, with simply blowing gas having a high hydrogen content from the usual tuyere, it is not easy to maintain stable hot metal production. On top of this, it is difficult to realize a fundamental cut in the carbon consumption.

Therefore, the inventors focused on adding the following element technologies to existing blast furnace operation technology so as to overcome the above problems. That is, they focused on the following requirements (A) to (C):

(A) Blowing in gas containing at least one of hydrogen and hydrocarbon from a usual tuyere.

In gas reduction rate of an ore, $H_2$ gas is superior to even CO gas. Gas containing at least one of $CH_4$ or other hydrocarbons containing a large amount of hydrogen and hydrogen is blown into the blast furnace as much as possible.

(B) Heating top gas from which $CO_2$ and other oxide components and steam ($H_2O$) have been removed and blowing it from a shaft tuyere.

Top gas wherein a ratio of gas having a reduction ability is high is produced by removing the oxide components and steam from the top gas, and the produced top gas is reutilized. By heating the produced top gas to a suitable temperature and again blowing it from a shaft tuyere into the inside of the blast furnace (below, referred to as "top gas recycling"), it is possible to improve the rate of utilization of the furnace reducing gas.

Further, (C) Blowing top gas from the usual tuyere without heating the top gas and increasing the oxygen enrichment of blast from the usual tuyere.

When blowing top gas from the usual tuyere, it is important to maintain the theoretical temperature of the gas generated due to the combustion in the combustion zone in front of the tuyere (below, referred to simply as the "flame temperature") in a suitable range. For this reason, it is preferable to not heat the top gas and make the oxygen enrichment of the blast from the usual tuyere 10% to 40%. As a result, it is possible to maintain the flame temperature within a suitable range while increasing the reducing gas component in the furnace gas. Further, it is no longer necessary to increase the injecting rate of pulverized coal for adjusting the flame temperature and is possible to avoid an extreme drop in the coke rate.

Note that, the value X of the oxygen enrichment (%) indicates the concentration of oxygen enriched from the normal blast. For example, the amount of oxygen concentration enriched from usual blast (air (oxygen concentration approximately 21%)) is expressed by the following formula:

$$X(\%)=(0.21 \times Vb/60+Vo/60)/(Vb+Vo/60) \times 100-21$$

where Vo: oxygen flow rate (Nm³/h)
Vb: Total blowing rate from usual tuyere including flow rate of top gas (Nm³/min)

Here, productivity of a blast furnace directly depends on the rate of oxygen blown into the blast furnace (referred to as the "rate of blown oxygen"). When making the oxygen enrichment rise under the condition that productivity is kept constant, to make the rate of blown oxygen constant, the general practice is to adjust the blowing rate downward.

Further, the upper limit value of the oxygen enrichment is restricted by the presence or absence of erosion of the lance and also changes by the composition of the gas blown. That is, the composition of the gas blown causes the upper limit (Y %) of the oxygen enrichment leading to erosion of the lance due to a temperature rise to differ. The fact that this is generally proportional to the content of $CH_4$ with respect to the composition of gas of the cooling medium in the gas and that this relationship is expressed by the following formula was confirmed by the inventors etc.

$$Y = 0.079 \times CH_4 + 32$$

where, Y: upper limit of oxygen enrichment (%)
$CH_4$ in the formula: vol % of methane contained in the gas blown into Further, if making the oxygen enrichment excessive, not only is there the possibility of erosion of the lance liable to occur, but also the focus of combustion in the raceway excessively moves to the wall side, insufficient heat conduction to the deadman or increasing heat loss at the wall side is invited, and the effect of the charged material also becomes unstable. By applying the above requirements, it is possible to achieve the object of the present invention.

EXAMPLES

Next, examples of the present invention will be explained, but the present invention is not limited to these.

The blast furnace operation was simulated based on blast furnace numerical analysis to study the effects of the present invention. For such simulation, for example, the so-called "blast furnace mathematical model" shown in K. Takatani, T. Inada, and Y. Ujisawa, ISIJ International, 39, (1999), p. 15 etc. was used.

Example 1

In Example 1, first, the inventors investigated in detail the above Requirement A "blowing gas containing at least one of hydrogen and a hydrocarbon from a usual tuyere".

Table 1 shows the standard parameters at the time of operation of the blast furnace (furnace volume 5300 m³) wherein pulverized coal is injected from the usual tuyere. Consider an operation of blowing $CH_4$-containing gas with a high hydrogen content. If making $CH_4$ rise in temperature to 800° C. or more, it breaks down under the heat whereby hydrogen gas is generated and the hydrogen gas functions as a reducing agent, so the effect of cutting the carbon consumption is obtained.

The $CH_4$-containing gas contains not only hydrogen, but also a large amount of hydrogen in the state of $CH_4$ or other hydrocarbons, so it is possible to provide it with the function of the reducing material. At this time, the $CH_4$ concentration is preferably 25% or more. The reason is that if the $CH_4$ concentration is less than 25%, even if increasing the oxygen enrichment, combustion in the tuyere-front combustion zone causes a drop in the function of adjusting the flame temperature and the effect of the Requirements (B) and (C) on raising the rate of utilization of the furnace reducing gas becomes insufficient.

As the $CH_4$-containing gas, it is possible to employ COG with a high hydrogen content, natural gas with a high $CH_4$ content, or city gas or shale gas and synthetic gas containing any ratio thereof and other existing gases containing $CH_4$. The composition of COG changes depending on the treatment of waste gas and the operating conditions of the coke oven and differs with each steel plant. The range of composition is generally $CH_4$: 25 to 38% and $H_2$: 47 to 59%.

TABLE 1

| Production* | 11350 t/d | Blast volume | 7650 Nm³/min |
|---|---|---|---|
| Hot metal temperature* | 1520° C. | Blast temperature* | 1200° C. |
| Coke rate | 340 kg/tHM | Oxygen enrichment | 3.40% |
| Pulverized coal rate* | 146 kg/tHM | Blast moisture | 25 g/Nm³ |
| Reducing agent rate | 486 kg/tHM | Flame temperature* | 2155° C. |
| Carbon consumption | 419 kg/tHM | | |

(*marked items are treated as fixed values in subsequent simulation of operation)

In this regard, to reduce and melt iron ore, the inside of the blast furnace is held at a high temperature under a reducing atmosphere. If blowing COG or natural gas or other $CH_4$-containing gas into this, the hydrocarbon content is pyrolyzed under heat and soot dust is generated. There is a danger of the soot filling the voids among the filler particles of the lumpy coke and other carbon sources and sintered ore clumps and therefore lowering the gas permeability inside the furnace. Therefore, it is preferable to blow the above-mentioned gases into the only region where an oxidizing atmosphere is formed in the blast furnace, that is, the combustion region in front of the usual tuyere. That is, it is desirable to blow in COG or natural gas or other $CH_4$-containing gas from the usual tuyere along with hot gas or pulverized coal.

The composition of COG or natural gas differs somewhat depending on the starting material of coal or on the production area, but in the simulation of operation, the contents shown in Table 2-1 and Table 2-2 as typical values were used. Further, the operating parameters were predicted by calculation using the method of making the pulverized coal rate constant and adjusting the coke rate and blowing rate so as to give productivity and hot metal temperatures shown in Table 1. Further, this is based on the premise that the flame temperature, which is considered to be important experience-wise in design of operations, is maintained constant by adjusting the oxygen enrichment.

TABLE 2-1

| | $CH_4$ (vol %) | $H_2$ (vol %) | CO (vol %) | $N_2$ (vol %) |
|---|---|---|---|---|
| Composition of coke oven gas (COG) | 37 | 48 | 12 | 3 |
| Composition of natural gas | 100 | 0 | 0 | 0 |

TABLE 2-2

| | Carbon (wt %) | Hydrogen (wt %) |
|---|---|---|
| Composition of pulverized coal | 82 | 4 |

Figure 2:
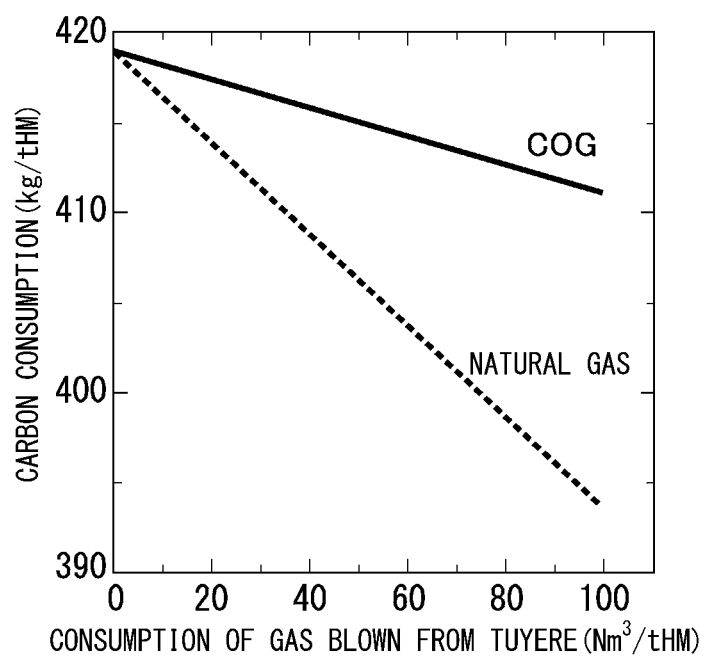
FIG. 2 is a view showing the relationship between the consumption of gas blown from a usual tuyere (COG and natural gas) ($Nm^3$/tHM) and the carbon consumption (kg/tHM).

The relationship between the consumption of gas (COG and natural gas) blown from the usual tuyere (Nm³/tHM) and the carbon consumption (kg/tHM) was obtained by simulation of blast furnace operation under the conditions of Table 2-1 and Table 2-2. This relation is shown in FIG. 2. Here, the carbon consumption (kg/tHM) means the specific consumption of the amount of carbon, that is, the amount of carbon charged or blown through coke, pulverized coal, COG, or natural gas per ton of hot metal. It is an amount directly connected with the $CO_2$ emissions accompanying production of hot metal. According to this figure, it will be understood that the carbon consumption decreases in accordance with the increase in COG consumption or natural gas consumption. This is because the hydrogen contained in a large amount in COG or natural gas contributes to reduction of the iron ore and the required amount of carbon is kept down.

In Example 1, furthermore, the inventors investigated in detail operation of a blast furnace comprising the above Requirement A and further the above Requirement B "heating top gas from which the oxide components and steam have been removed and blowing it in from the shaft tuyere".

Figure 3:
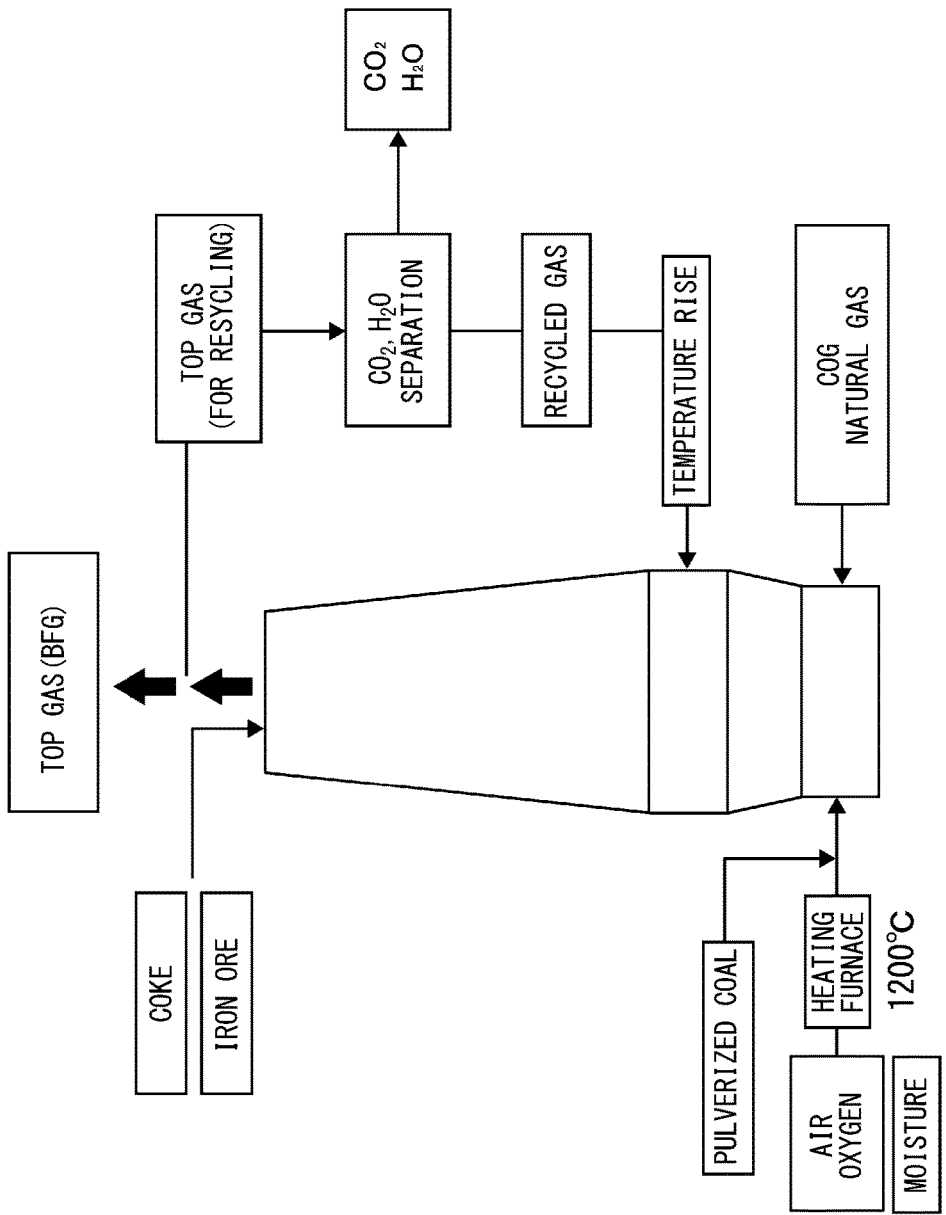
FIG. 3 is a view showing a (Requirement A+Requirement B) process in brief.

FIG. 3 shows the (Requirement A+Requirement B) process in brief. The main components of the top gas exhausted from the top of the blast furnace are CO, $CO_2$, $H_2$, $N_2$, and $H_2O$ (steam), but the steam is removed by the cooling in the existing process of the treatment for cleaning the exhaust gas. On the other hand, $CO_2$ remains in the top gas, but if removing this, the reduction ability of the top gas on the ore is greatly restored. Technology for separating and recovering $CO_2$ from gas has already been developed, so it is sufficient to introduce the existing technology for separating and removing $CO_2$ into the blast furnace process system to thereby perform the (Requirement A+Requirement B) process.

It is also possible to blow in high temperature gas with a high hydrogen content from the shaft tuyere in addition to the top gas from which the oxide components and $H_2O$ have been removed. COG is readily available in steel plants, so it is preferable to use COG. However, if blowing $CH_4$ from the shaft tuyere, soot precipitates and reduction of the iron ore is inhibited, so it is preferable to blow COG which has been modified in $CH_4$ content etc. The composition of the modified COG is, for example, $H_2$: 68%, $CH_4$: 5%, $C_2H_4$: 1%, CO: 17%, $N_2$: 2%, and $H_2O$: 7%. In order to secure the reduction ability of top gas blown from the shaft tuyere, the temperature of the gas is preferably made 750° C. or more. Furthermore, in order to raise the ratio of the component having the reduction ability, it is preferable to blow modified COG after removing the moisture.

In order to investigate the advantageous effect of the (Requirement A+Requirement B) process, the inventors ran a simulation predicting the effect of blowing top gas after removal of $CO_2$ and $H_2O$ from the shaft tuyere under conditions of injecting pulverized coal from the usual tuyere and blowing COG or natural gas. Here, it is advantageous to set the position at which the top gas after removal of $CO_2$ and $H_2O$ is blown into the blast furnace to the location where gas reduction progresses actively. This position was set to a position corresponding to the furnace temperature 1100° C. calculated at the time of normal operation shown in Table 1. Existing blast furnaces do not have apertures which gas is blown into at such that location, so a shaft tuyere is newly provided.

The above simulation was performed by recycling top gas under the conditions of Table 3. In Table 3, "recycled gas" means recycled gas in the top gas recycling that is used for simulation. The predicted values of the parameters at the time of operation were made the standard parameters in the same way as the case of Table 1.

TABLE 3

| | |
|---|---|
| Recycling rate of top gas from shaft tuyere | 0 to 30% |
| Blowing rate of recycled gas from shaft tuyere | 100 to 600 $Nm^3$/tHM |
| Blowing temperature of recycled gas from shaft tuyere | 400 to 1000° C. |
| Blowing rate of COG from usual tuyere | 95 $Nm^3$/tHM |

Figure 4:
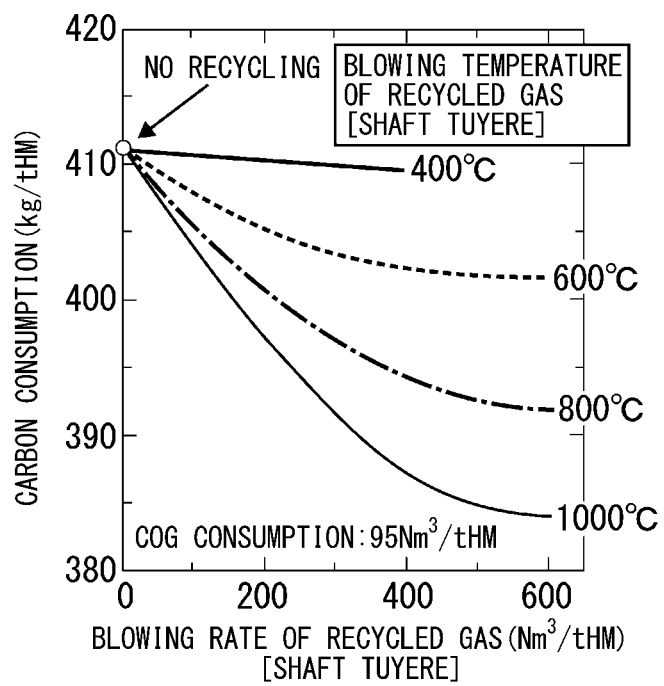
FIG. 4 is a view showing the change in the carbon consumption (kg/tHM) associated with blowing a recycled gas from a shaft tuyere at the time of making COG consumption blown from a usual tuyere 95 (Nm³/tHM) in the (Requirement A+Requirement B) process.

FIG. 4 is a graph obtained by simulation of an operation of performing the top gas recycling under the conditions of Table 3 and shows the change in the carbon consumption (kg/tHM) accompanying an increase in the blowing rate of recycled gas from the shaft tuyere when fixing COG consumption blown from the usual tuyere at 95 (kg/tHM). As will be understood from FIG. 4, by increasing the blowing rate of recycled gas from the shaft tuyere, it is possible to cut the carbon consumption (kg/tHM). That is, the carbon content recharged into the furnace through the recycled gas is not the carbon charged from outside the blast furnace system, so the recycling of the top gas based on the present invention can raise the efficiency of utilization of the reducing gas and cut the carbon consumption (kg/tHM).

However, the effect of reduction of the carbon consumption of the blast furnace by the recycled gas tends to be saturated if the blowing rate of the recycled gas from the shaft tuyere excessively increases. This is understood to be due to the fact that even if increasing gas reducing rate in the furnace more than necessary, the speed of the reduction reaction of the iron ore cannot be kept up with. On the other hand, even in terms of the flow of material in the furnace, excessive reducing gas in the furnace raises the risk of fluidization of the packed layer in the furnace or the increase in pressure drop resulting in the phenomenon of channeling. Therefore, to reliably obtain the effect of cutting the carbon consumption of a blast furnace and to ensure stable operation under the conditions for application of the present invention, it is preferable to make the lower limit of the blowing rate of recycled gas 100 $Nm^3$/tHM and make the upper limit of the recycled gas rate 400 $Nm^3$/tHM.

Furthermore, FIG. 4 shows the results of investigation of the blowing temperature of the recycled gas blown from the shaft tuyere to the inside of the furnace. According to FIG. 4, the higher the temperature of the recycled gas blown from the shaft tuyere is made, the higher the effect of reduction of the carbon consumption (kg/tHM). This is due to not only the effect of reutilization of the reducing gas, but also the effect of the increase of the amount of heat input to the blast furnace through the sensible heat of the recycled gas. However, what should be noted is the point that if the temperature of the recycled gas falls below about 600° C., almost no effect of the reduction of the carbon consumption (kg/tHM) appears. This phenomenon is due to the fact that if excessively lowering the blowing temperature, the detrimental effect of both the temperature distribution in the blast furnace being remarkably lowered and the progression of the reduction reaction ending up being blunted becomes remarkable.

Therefore, in recycling top gas, the temperature when blowing recycled gas from the shaft tuyere to the inside of the blast furnace is preferably at least 600° C. Further, the upper limit temperature is preferably kept down to 1000° C. or less where there is no danger of the iron ore in the furnace softening-melting and the progression of gas reduction being obstructed.

To further investigate the advantageous effect of the (Requirement A+Requirement B) process, the inventors investigated a change in the carbon consumption (kg/tHM) in the case of blowing respectively sole pulverized coal, COG and pulverized coal, and natural gas and pulverized coal from the usual tuyere in the (Requirement A+Requirement B) process. First, they operated a blast furnace operated using a standard method under the parameters shown in Table 1 so as to respectively blow in COG, natural gas, and pulverized coal from the usual tuyere under the conditions of Table 4 so that rate of the reducing matter charged from the usual tuyere (total value of carbon C and hydrogen $H_2$) becomes substantially constant. The inventors compared the amount of reduction of the carbon consumption (kg/tHM) when recirculating the top gas from the shaft tuyere under conditions of 400 $Nm^3$/tHM, 800° C. At this time, the inventors investigated the oxygen enrichment of blast for blowing the COG, natural gas, and pulverized coal from the usual tuyere into the inside of the blast furnace so that the flame temperature becomes constant.

TABLE 4

|  | Blowing rate (*) | Blowing rate of reducing matter | $H_2$ content in reducing matter |
| --- | --- | --- | --- |
| Pulverized coal | 84 kg/tHM | 7.4 kmol/tHM | 23 mol % |
| COG | 95 $Nm^3$/tHM | 7.3 kmol/tHM | 71 mol % |
| Natural gas | 50 $Nm^3$/tHM | 6.7 kmol/tHM | 67 mol % |

(*): Blowing rate added to pulverized coal rate of 146 kg/tHM of Table 1

Figure 5:
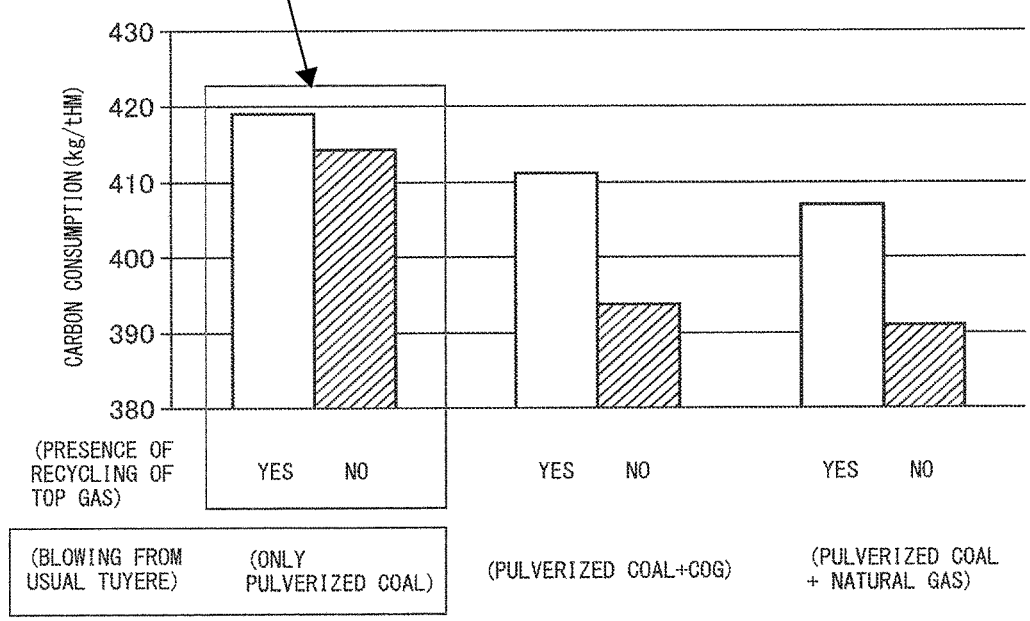
FIG. 5 is a view showing the carbon consumption (kg/tHM) at the time of additionally blowing in any one of pulverized coal, COG, or natural gas from a usual tuyere into a blast furnace operating in a standard manner with no Requirement B and the carbon consumption (kg/tHM) at the time of additionally blowing in any one of pulverized coal, COG, or natural gas from a usual tuyere in a (Requirement A+Requirement B) process.

The results of the above operation are shown in FIG. 5. FIG. 5 shows the carbon consumption (kg/tHM) when additionally blowing any one of pulverized coal, COG, or natural gas from the usual tuyere into a blast furnace which is operated in a standard manner without the Requirement B and the carbon consumption (kg/tHM) when additionally blowing any one of pulverized coal, COG, or natural gas from the usual tuyere into a blast furnace which is operated in a standard manner in the (Requirement A+Requirement B) process. In FIG. 5, by combining the operation of blowing COG or natural gas of a high hydrogen content from the usual tuyere with the top gas recycling, the effect of reduction of the carbon consumption (kg/tHM) clearly appears. This effect is due to the characteristic that with respect to the reduction of iron ore, $H_2$ gas has a faster reaction speed than CO gas. The Requirement B utilizing this characteristic is shown to give rise to a special effect under the Requirement A.

In this way, the top gas recycling in the present invention exhibits special effects under the (Requirement A+Requirement B). That is, in an operation of blowing COG or natural gas with a high hydrogen content from the usual tuyere, the top gas recycling from the shaft tuyere is particularly effective for reducing the carbon consumption (kg/tHM).

Example 2

Next, the inventors studied the operation of a blast furnace further adding to the above (Requirement A+Requirement B) the Requirement C of "blowing top gas from the usual tuyere without heating and increasing the oxygen enrichment of blast".

Figure 6:
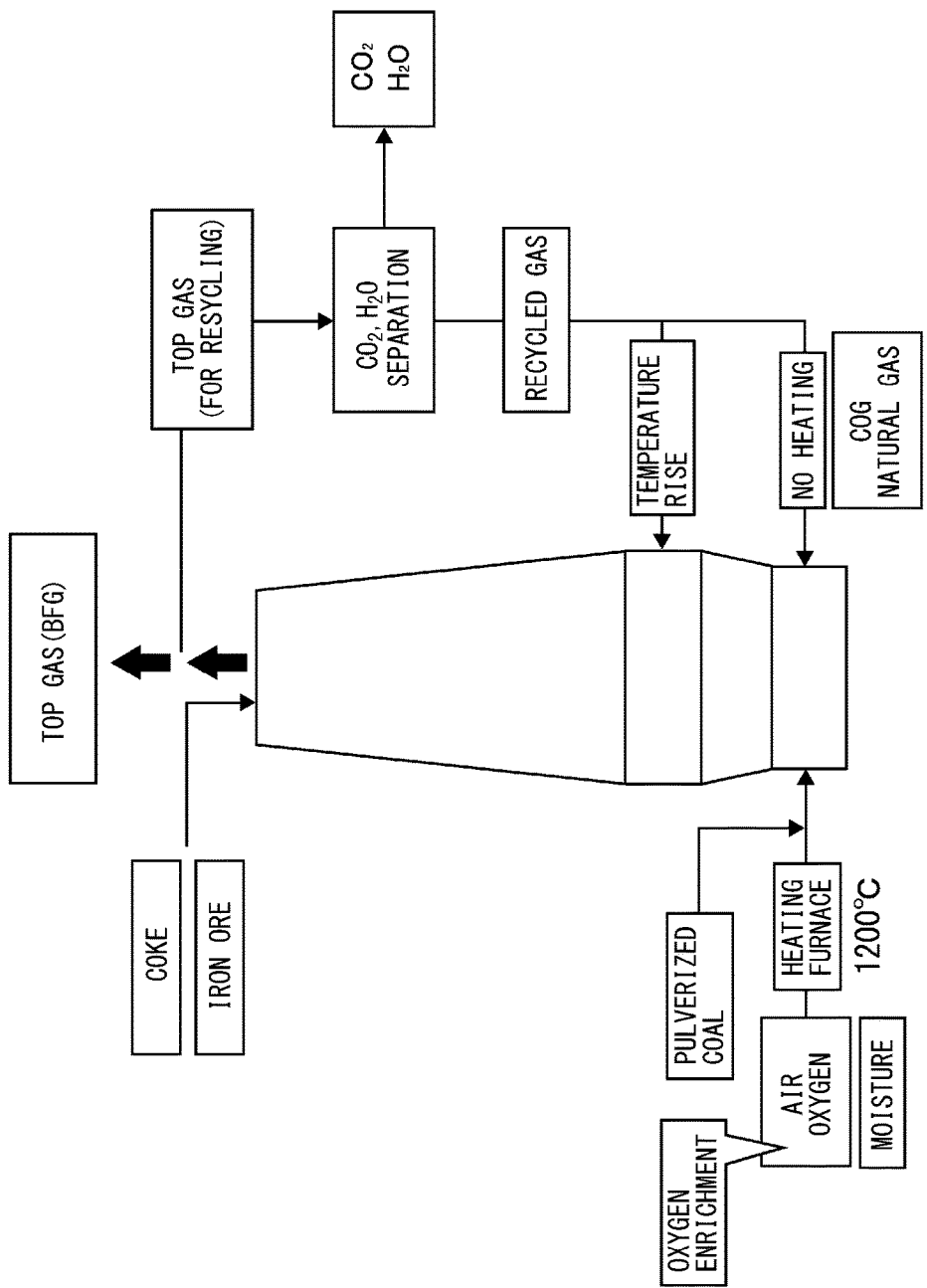
FIG. 6 is a view showing a summary of a (Requirement A+Requirement B+Requirement C) process.

FIG. 6 shows the (Requirement A+Requirement B+Requirement C) process in brief. The Requirement C of the present invention further promotes the reduction of the carbon consumption (kg/tHM) under the (Requirement A+Requirement B). By combining the Requirement C, it is possible to maintain combustion conditions of the tuyere-front combustion location of the blast furnace at a suitable range and reach a coke rate at a level capable of actual operation by existing operating technology.

As explained above, the upper limit value of the oxygen enrichment is restricted by the presence of erosion of the lance and changes due to the composition of the blast gas. In the case of the present example of only blowing COG containing $CH_4$: 37% from the tuyere, if the oxygen enrichment is 35%, the temperature of the outside of the lance excessively rises and invites erosion of the lance. On the other hand, in the case of the later explained Example 3 of blowing natural gas containing $CH_4$: approximately 100% from the tuyere, if the oxygen enrichment is 40%, erosion of the lance occurs. In this way, the upper limit (Y %) of the oxygen enrichment leading to erosion of the lance due to a temperature rise differs depending on the composition of the gas blown into. This is proportional to the content of $CH_4$ in the composition of the gas of the cooling medium in the gas. The relationship is represented by the following formula:

$$Y=0.079 \times CH_4+32$$

where, Y: upper limit of oxygen enrichment (%) $CH_4$: vol % of $CH_4$ contained in gas blown into The inventors ran operations for blowing COG-containing gas from the usual tuyere under the conditions shown in Table 5 and investigated the change in the carbon consumption (kg/tHM) relating to the oxygen enrichment (10% to 35%) under the condition that a flame temperature is fixed. Further, a shaft tuyere was provided at the middle stage of the blast furnace, the blowing rate of recycled gas from the shaft tuyere was made 200 $Nm^3$/tHM and 400 $Nm^3$/tHM, and the blowing temperature of the recycled gas from the shaft tuyere was made 800° C. Further, the injecting rate of pulverized coal from the usual tuyere in this example was set in the same way as the value shown in Table 1.

TABLE 5

| Blowing rate of COG (usual tuyere) | COG 95 $Nm^3$/tHM |
| --- | --- |
| Blowing rate of recycled gas (shaft tuyere) | 200 $Nm^3$/tHM; 400 $Nm^3$/tHM |
| Blowing rate of recycled gas (usual tuyere) | Rate required for maintaining flame temperature at 2155° C. |
| Blowing temperature of recycled gas (shaft tuyere) | 800° C. |
| Blowing temperature of recycled gas (usual tuyere) | Ordinary temperature (25° C.) |
| Oxygen enrichment (usual tuyere) | 15 to 40% |

Figure 7:
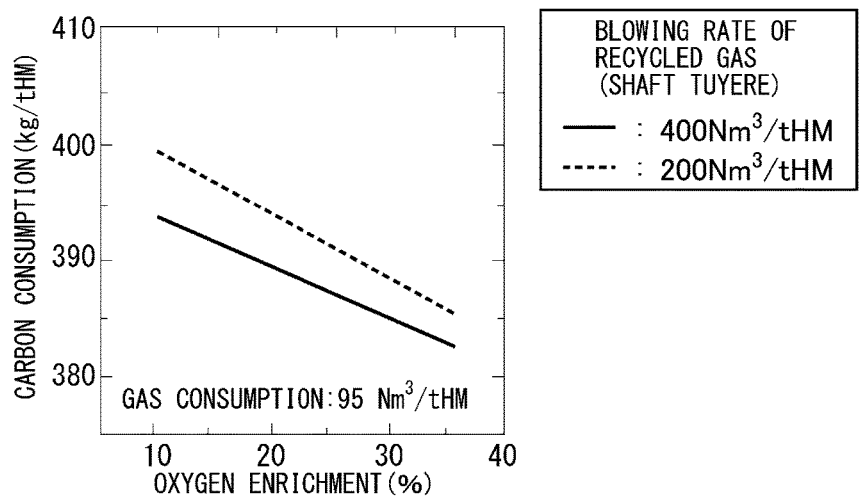
FIG. 7 are views showing the relationship among the operation indices of a blast furnace in the case of making the COG consumption blown from a usual tuyere a value of 95 (Nm³/tHM) in the (Requirement A+Requirement B+Requirement C) process.
Figure 7:
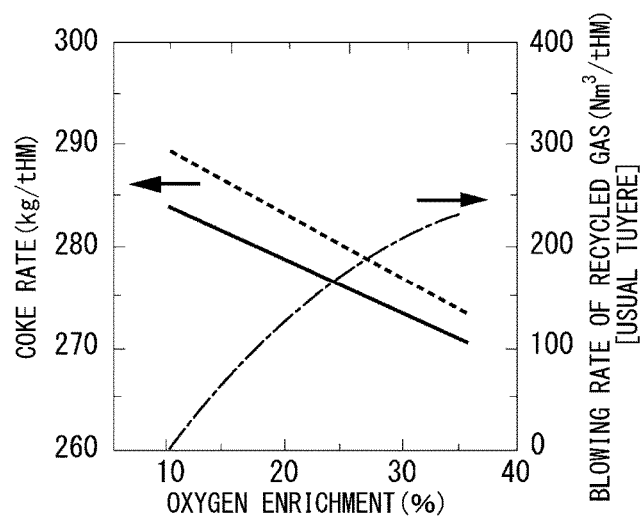
Figure 7:
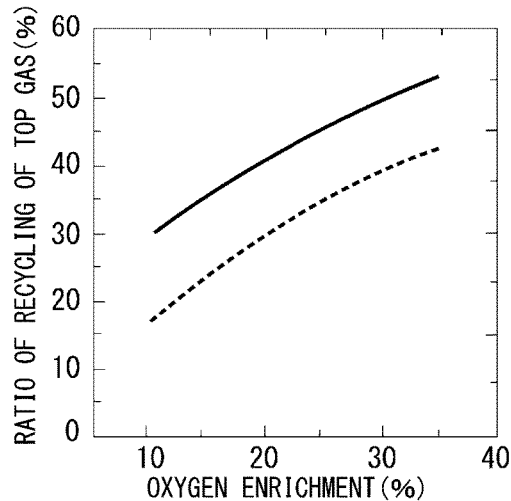

FIG. 7 are views showing the relationship among the operation indices of a blast furnace in the case of making COG consumption blown from the usual tuyere 95 ($Nm^3$/tHM) in the (Requirement A+Requirement B+Requirement C) process under the conditions of Table 5. FIG. 7A shows the relationship between the oxygen enrichment (%) and carbon consumption (kg/tHM). The ratio of the $N_2$ (nitrogen) gas in the furnace gas falls along with an increase in the oxygen enrichment, while the concentration of the reducing components, that is, $H_2$ and CO increases, so the effect of the top gas recycling operation of the Requirement B of the present invention is amplified. FIG. 7B shows the relationship between the oxygen enrichment (%) and coke rate (kg/tHM) and the relationship between the oxygen enrichment (%) and blowing rate recycled gas from the usual tuyere ($Nm^3$/tHM). By blowing part of the recycled gas at an ordinary temperature from the usual tuyere in a suitable amount, it is possible to maintain the flame temperature without increasing the pulverized coal rate and possible to attain a coke rate of actual range capable of stable operation of 270 kg/tHM or more while cutting the carbon consumption (kg/tHM) of the blast furnace to about 380 kg/tHM. This corresponds to a reduction of approximately 9% with respect to the time of normal operation of Table 1.

FIG. 7C shows the relationship between the oxygen enrichment (%) and the recycled gas ratio of top gas (%). The recycled gas ratio (%) of the top gas means the volume ratio (%) of the blowing rate of reduced gas from the usual tuyere and shaft tuyere with respect to the total rate of top gas. Along with the increase of the oxygen enrichment, the blowing rate of reducing gas from the usual tuyere increases and the flame temperature is maintained constant (2155° C.). Here, the present invention is not restricted in the coke rate level of the blast furnace operation.

Normally, in blast furnace operation, to secure the heat generation at the bottom of the furnace, the general practice is to adjust the blowing conditions so that the combustion temperature in front of the tuyere becomes a constant approximately 2155° C. If operating under conditions where the flame temperature falls, a drop in furnace heat and hot metal temperature is caused over a long term and tapping problems, cooldown, and other serious operational trouble will be induced. In the operation for blowing COG or natural gas from the tuyere, the gas sensible heat introduced falls due to the endothermic reaction accompanying decomposition of the main component $CH_4$ and blowing of cooling air into the blast furnace, and the flame temperature falls.

To compensate for this, oxygen enrichment of blast is effective. Further, the main components of the top gas are CO and $H_2$, so the recycled gas of the top gas does not burn in front of the tuyere and is blown in by the cooling air, so the sensible heat of the introduced gas falls and the flame temperature falls. In this case as well, it is possible to raise the oxygen enrichment in accordance with the blowing rate of recycled gas to compensate for the heat. If raising the oxygen enrichment, in order to make productivity constant, the blowing rate is decreased and the charging rate of oxygen into the furnace is adjusted to become constant. As a result, along with the increase of the oxygen enrichment, the $N_2$ in the furnace gas is decreased and the concentration of the CO, $H_2$, or other reducing gas relatively rises. This leads to amplification of the effect of the top gas recycling operation of the Requirement B.

Example 3

Figure 8:
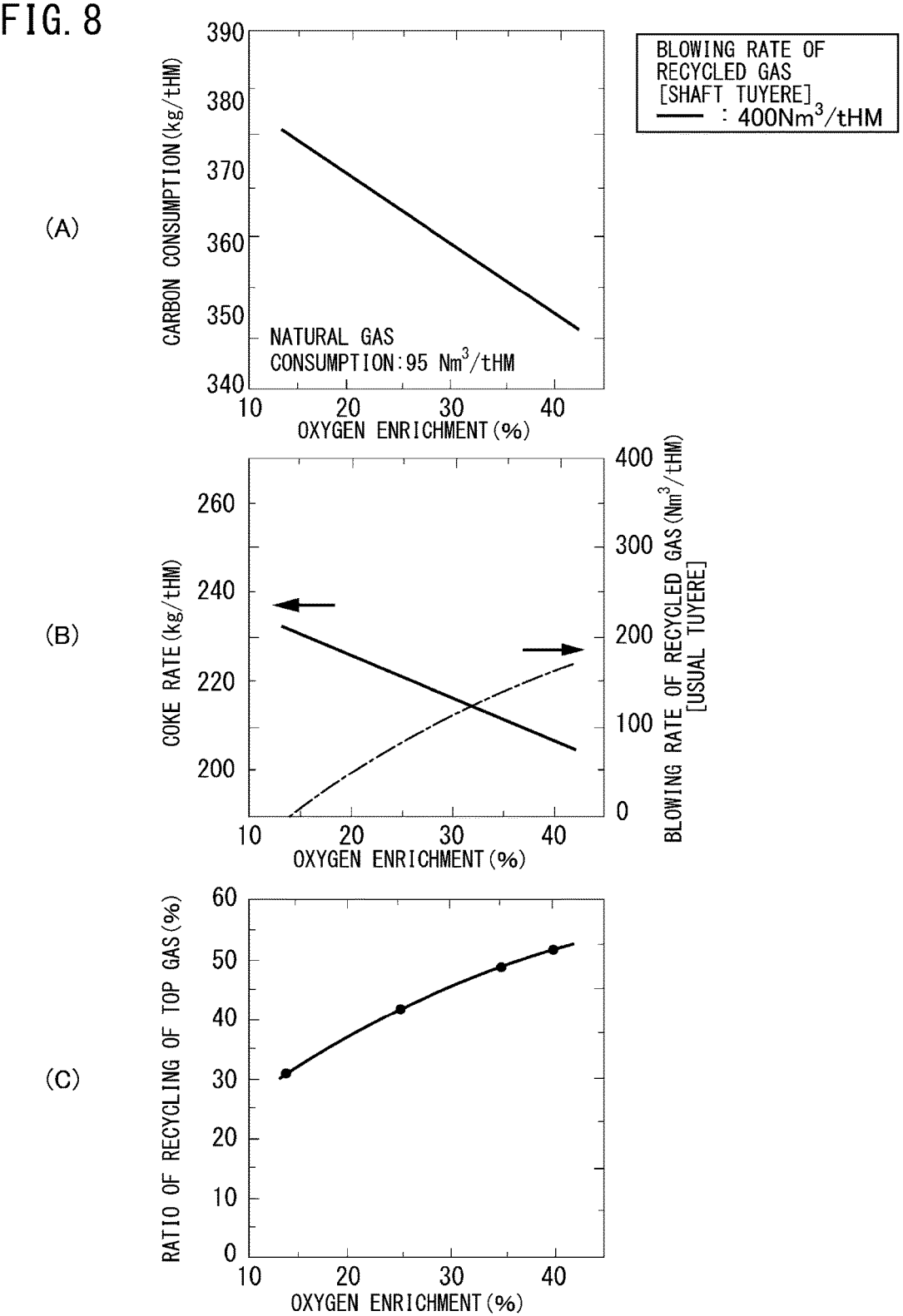
FIG. 8 are views showing the relationship among the operation indices of a blast furnace in the case of making the natural gas consumption blown from a usual tuyere a value of 95 (Nm³/tHM) in the (Requirement A+Requirement B+Requirement C) process.

FIG. 8 show the relationship among the operation indices of a blast furnace in the case of making natural gas consumption blown from the usual tuyere 95 ($Nm^3$/tHM) in the (Requirement A+Requirement B+Requirement C) process. Here, the operating conditions in the (Requirement A+Requirement B+Requirement C) process of FIG. 8 are shown in Table 6. Except for the blown gas changing from COG to natural gas, making the blowing rate of recycled gas from the shaft tuyere 400 $Nm^3$/tHM and making the blowing temperature 800° C., the conditions are the same as the conditions studied in Table 5.

TABLE 6

| | |
|---|---|
| Blowing rate of natural gas (usual tuyere) | 95 $Nm^3$/tHM |
| Blowing rate of recycled gas (shaft tuyere) | 400 $Nm^3$/tHM |
| Blowing rate of recycled gas (usual tuyere) | Rate required for maintaining flame temperature at 2155° C. |
| Blowing temperature of recycled gas (shaft tuyere) | 800° C. |
| Blowing temperature of recycled gas (usual tuyere) | Ordinary temperature (25° C.) |
| Oxygen enrichment (usual tuyere) | 15 to 40% |

FIG. 8A shows the relationship between the oxygen enrichment and the carbon consumption (kg/tHM). FIG. 8B shows the relationship between the oxygen enrichment and coke rate (kg/tHM) and the relationship between the oxygen enrichment (%) and blowing rate of recycled gas from the usual tuyere ($Nm^3$/tHM). FIG. 8C shows the relationship between the oxygen enrichment and the recycled gas ratio of top gas (%). In this case, the blast furnace has to be operated at a coke rate level of 250 kg/tHM or less, but by making the oxygen enrichment up to 40%, it is possible to cut the carbon consumption of the blast furnace down to about 350 kg/tHM. This corresponds to a cut of approximately 15% with respect to the time of normal operation of Table 1.

Example 4

In Example 4, the inventors investigated the effect in the case of changing the amount of COG or natural gas blown from the usual tuyere in the (Requirement A+Requirement B) process and further blowing top gas from the usual tuyere without heating and increasing the oxygen enrichment of blast from the usual tuyere in the Requirement C process.

Figure 9:
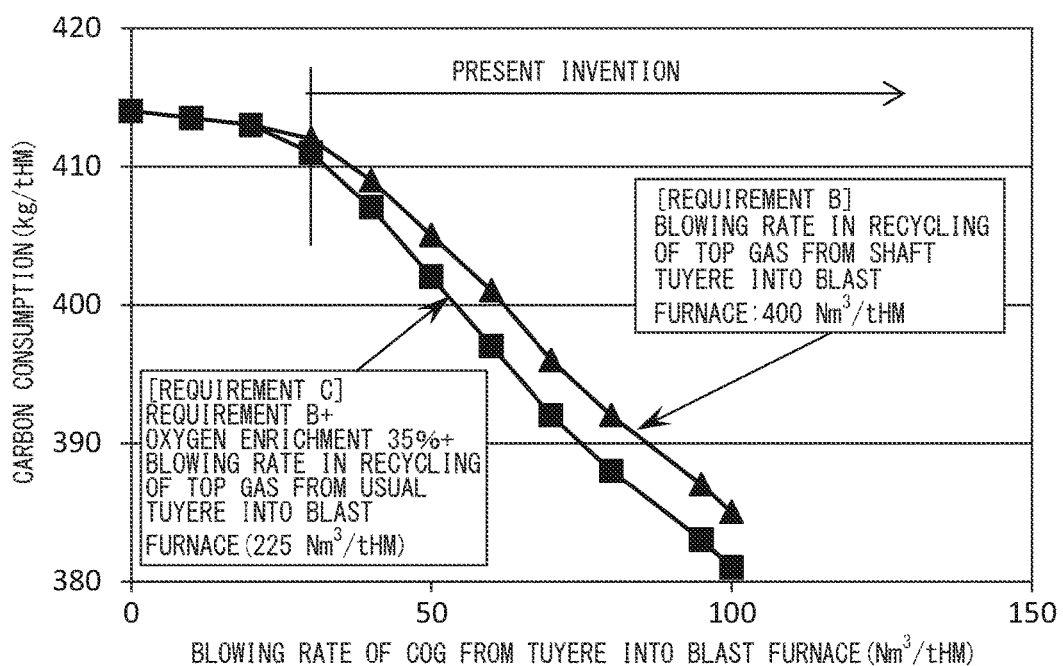
FIG. 9 is a graph showing the relationship between the COG amount and carbon consumption in the case of changing the blowing rate of COG blown from a usual tuyere, further blowing top gas from the usual tuyere without heating the top gas in the Requirement C process, and increasing the oxygen enrichment of blast from the usual tuyere in the (Requirement A+Requirement B) process.

FIG. 9 shows an example of changing the rate of COG blown from the usual tuyere into a blast furnace adjusted in coke rate in the (Requirement A+Requirement B) process so that the hot metal temperature does not fall under 1520° C. by the asterisked parameters of Table 1 so as to realize a stable operating state of the blast furnace. As shown in FIG. 9, when making the blowing rate of the top gas recycling from the shaft tuyere 400 $Nm^3$/tHM in the Requirement B, no large improvement was seen in the carbon consumption with a rate of COG blown from the usual tuyere of less than 30 $Nm^3$/tHM. This is due to the fact that the rate of COG blown from the usual tuyere is too small and the effect of amplification of $H_2$ recycling could not be sufficiently exhibited. On the other hand, if making the blowing rate of COG from the usual tuyere 30 $Nm^3$/tHM or more, the carbon consumption was greatly improved along with an increase in the blowing rate of COG.

When making the oxygen enrichment of blast from the usual tuyere increase up to 35% and simultaneously making the rate of top gas blown from the usual tuyere 225 $Nm^3$/tHM in the Requirement C, if the rate of COG blown from the usual tuyere is less than 30 $Nm^3$/tHM, in the same way as the Requirement B, no large improvement could be seen in the carbon consumption. This is due to the blowing rate being too small and the effect of amplification of $H_2$ recycling not being sufficiently exhibited. On the other hand, when a rate of COG blown from the usual tuyere is 30 $Nm^3$/tHM or more, the carbon consumption could be greatly improved over the (Requirement A+Requirement B) process in accordance with the increase in the blowing rate of COG. Note that, in each requirement, the more the blowing rate is made to increase, the more the carbon consumption can be lowered.

Figure 10:
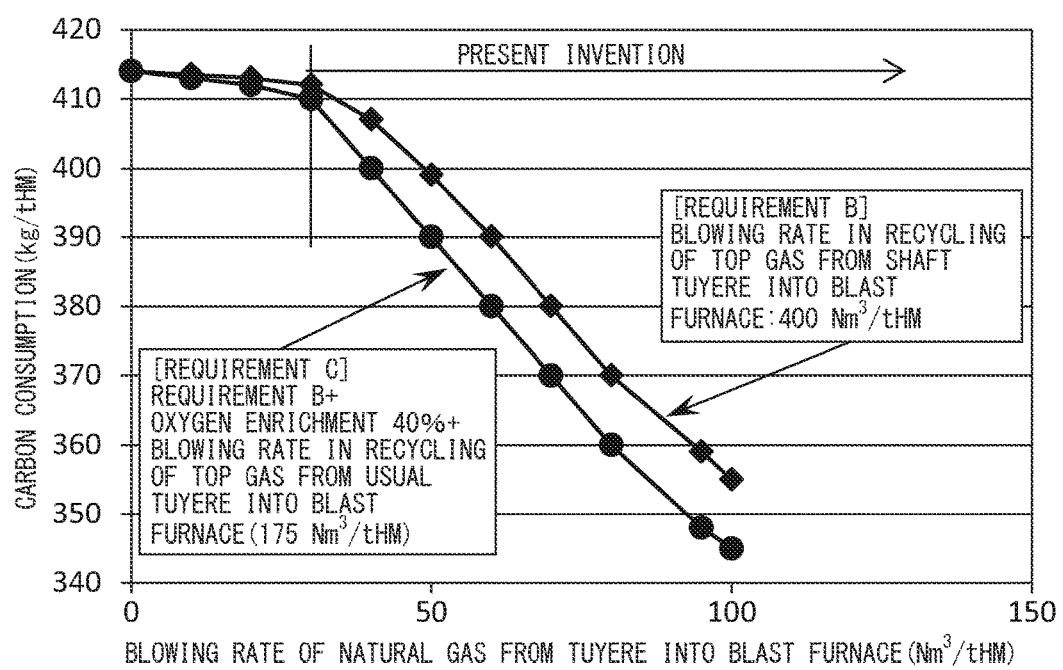
FIG. 10 is a graph showing the relationship between the rate of natural gas and carbon consumption in the case of changing the amount of natural gas blown from a usual tuyere, further blowing top gas from the usual tuyere without heating the top gas in the Requirement C process, and increasing the oxygen enrichment of blast from the usual tuyere in the (Requirement A+Requirement B) process.

FIG. 10 shows an example changing the blowing rate of natural gas from the usual tuyere into a blast furnace adjusted in coke rate in the (Requirement A+Requirement B) process so that the hot metal temperature does not fall under 1520° C. under the asterisked parameters in Table 1 for realizing a stable operating state. As with the case of blowing COG from the usual tuyere, when making the blowing rate of top gas recycling from the shaft tuyere 400 $Nm^3$/tHM in the Requirement B, with a rate of natural gas blown from the usual tuyere of less than 30 $Nm^3$/tHM, no large improvement is seen in the carbon consumption. However, when increasing the oxygen enrichment of blast from the usual tuyere up to 40% and simultaneously making the rate of top gas blown from the usual tuyere 175 Nm³/tHM in the Requirement C, if making the rate of natural gas blown from the usual tuyere 30 Nm³/tHM or more, the carbon consumption was greatly improved along with an increase in the blowing rate. Note that, the rate of use of natural gas is not limited, but a rise in manufacturing cost is invited, so it is possible to set the rate of use of natural gas in the range giving a predetermined effect.

As explained above, in the future, if operating technology is improved and the minimum coke rate level which enables stable operation further falls, it will become possible to more positively apply the present invention (to a raise in the oxygen enrichment) and to greatly reduce the carbon consumption of the blast furnace. Note that, preferred embodiments of the present invention were explained, but the present invention is not limited to these examples. It is clear to a person having ordinary skill in the technical field to which the present invention belongs that various changes or alterations could be made within the technical idea described in the claims. These will also naturally be understood as falling in the technical scope of the present invention.

INDUSTRIAL APPLICABILITY

According to the present invention, it is possible to provide a method for operation of a blast furnace able to reduce $CO_2$ emissions and produce hot metal in a commercial blast furnace stably over a long period.

The invention claimed is:

1. A method for operation of a blast furnace in which iron ore and coke are charged from a furnace top and pulverized coal is injected from a usual tuyere provided at a lower stage of the furnace at the side below a shaft tuyere, comprising
blowing a blast containing at least one of hydrogen and hydrocarbon from said usual tuyere together with said pulverized coal,
blowing a gas comprised of a first part of a top gas of the blast furnace from which carbon dioxide and steam are removed from the shaft tuyere into the blast furnace,
blowing a second part of said top gas from the usual tuyere without heating the second part thereof, and
raising an oxygen enrichment of gas blown from the usual tuyere,
wherein said blast from the usual tuyere is enriched with oxygen by an oxygen enrichment of 10% not less than and not more than by a Y % shown in the following formula:

$Y = 0.079 \times CH_4 + 32$ wherein $CH_4$ indicates a vol % of methane in the blast blown in from the usual tuyere, and the vol % of the blast blown in from the usual tuyere is in a range from 0 to 100.

2. The method for operation of a blast furnace according to claim 1, further comprising blowing a gas comprised of the second part of the top gas of the blast furnace from which carbon dioxide and steam are removed from the usual tuyere into the blast furnace.

3. The method for operation of a blast furnace according to claim 1, wherein a blowing rate of the blast containing at least one of hydrogen and hydrocarbon is 30 Nm³/tHM or more.

4. The method for operation of a blast furnace according to claim 1, wherein said top gas blown from the shaft tuyere is blown from said shaft tuyere by a blowing rate of 400 Nm³/tHM or less at a temperature of 600° C. to 1000° C.

5. The method for operation of a blast furnace according to claim 1, wherein the blowing rate of the top gas blown from said shaft tuyere is 100 Nm³/tHM or more.

6. The method for operation of a blast furnace according to claim 1, wherein the blast containing at least one of hydrogen and hydrocarbon blown from said usual tuyere contains methane.

7. The method for operation of a blast furnace according to claim 6, wherein the blast containing methane includes at least one of coke oven gas and natural gas.

8. The method for operation of a blast furnace according to claim 2, wherein a blowing rate of the blast containing at least one of hydrogen and hydrocarbon is 30 Nm³/tHM or more.

9. The method for operation of a blast furnace according to claim 2, wherein said top gas blown from the shaft tuyere is blown from said shaft tuyere by a blowing rate of 400 Nm³/tHM or less at a temperature of 600° C. to 1000° C.

10. The method for operation of a blast furnace according to claim 3, wherein said top gas blown from the shaft tuyere is blown from said shaft tuyere by a blowing rate of 400 Nm³/tHM or less at a temperature of 600° C. to 1000° C.

11. The method for operation of a blast furnace according to claim 2, wherein the blowing rate of the top gas blown from said shaft tuyere is 100 Nm³/tHM or more.

12. The method for operation of a blast furnace according to claim 3, wherein the blowing rate of the top gas blown from said shaft tuyere is 100 Nm³/tHM or more.

13. The method for operation of a blast furnace according to claim 4, wherein the blowing rate of the top gas blown from said shaft tuyere is 100 Nm³/tHM or more.

14. The method for operation of a blast furnace according to claim 2, wherein the blast containing at least one of hydrogen and hydrocarbon blown from said usual tuyere contains methane.

* * * * *

UNITED STATES PATENT AND TRADEMARK OFFICE
CERTIFICATE OF CORRECTION

PATENT NO. : 10,106,863 B2
APPLICATION NO. : 15/110073
DATED : October 23, 2018
INVENTOR(S) : Takanobu Inada et al.

Page 1 of 1

It is certified that error appears in the above-identified patent and that said Letters Patent is hereby corrected as shown below:

On the Title Page

Item (71), Applicants, please change the name of the (3rd) Applicant from:
"KOBE STEEL, LTD., Kobe-shi, Hyogo (JP)"
To:
--KABUSHIKI KAISHA KOBE SEIKO SHO (KOBE STEEL, LTD.), Kobe-shi, Hyogo (JP)--

Item (73), Assignees, please change the name of the third (3rd) Assignee from:
"KOBE STEEL, LTD., Kobe-shi (JP)"
To:
--KABUSHIKI KAISHA KOBE SEIKO SHO (KOBE STEEL, LTD.), Kobe-shi (JP)--

Signed and Sealed this
Fourteenth Day of May, 2019

Andrei Iancu
*Director of the United States Patent and Trademark Office*